Figure 1:
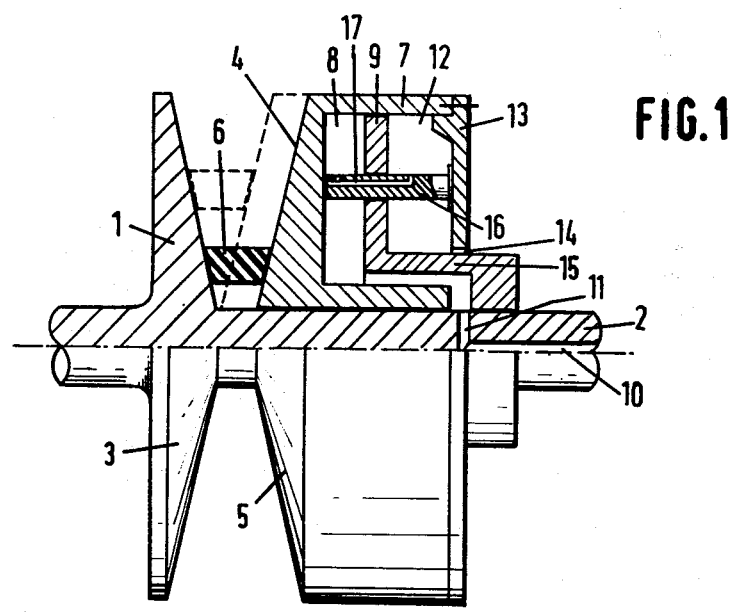

United States Patent [19]
van Deursen et al.

[11] 4,143,558
[45] Mar. 13, 1979

[54] VARIABLE-V-BELT TRANSMISSION

[75] Inventors: Petrus H. van Deursen, Deurne; Hemmo H. J. Ludoph, Heeze, both of Netherlands

[73] Assignee: Van Doorne's Transmissie B.V., Tilburg, Netherlands

[21] Appl. No.: 738,592

[22] Filed: Nov. 3, 1976

[30] Foreign Application Priority Data

Nov. 6, 1975 [NL] Netherlands ......................... 7513019

[51] Int. Cl.² .............................................. F16H 55/52
[52] U.S. Cl. ............................................... 74/230.17 F
[58] Field of Search .................................. 74/230.17 F

[56] References Cited

U.S. PATENT DOCUMENTS

| 3,052,132 | 9/1962 | Dittrich et al. | 74/230.17 F |
| 3,195,368 | 7/1965 | Boudewijn | 74/230.17 F X |
| 3,600,960 | 8/1971 | Karig | 74/230.14 F |
| 3,782,213 | 1/1974 | Rattunde | 74/230.17 F |

FOREIGN PATENT DOCUMENTS 2118083  1/1973  Fed. Rep. of Germany .... 74/230.17 F

*Primary Examiner*—Samuel Scott
*Assistant Examiner*—Don E. Ferrell
*Attorney, Agent, or Firm*—Cushman, Darby & Cushman

[57] ABSTRACT

The invention concerns a stepless variable belt transmission with pulleys which comprise two axially movable conical halves. The displacement of the pulley halves is effected by hydraulic piston-cylinder units rotating along with the pulleys. At least one hydraulic piston-cylinder unit is provided with a compensation chamber wherein a pressure is built up as a function of the speed. According to the invention the compensation chamber communicates with a closable opening with the cylinder chamber by means of which the pulley halves are relatively moved.

2 Claims, 4 Drawing Figures

VARIABLE-V-BELT TRANSMISSION

The invention relates to a stepless variable transmission having an endless transmission means and at least a V-shaped pulley of which at least one disc side plate is fixedly connected to a hydraulic cylinder-piston unit for axially moving said side plate, the cylinder-piston unit being provided with a pressure compensation chamber for compensating pressure increases in the cylinder space as a result of centrifugal forces, said pressure compensation chamber being adapted to be filled via a filling hole with liquid from the cylinder space. The endless transmission means may e.g. be a V-belt and reference will always be made in the specification to a V-belt.

Such an apparatus is known from U.S. Pat. No. 3,782,213 wherein a number of embodiments are described of a cylinder integral with a disc side plate, the piston being fixedly connected to the shaft of the pulley and provided with a filling hole connecting the cylinder space with the compensation space. The piston forms the partition between the cylinder space and the compensation chamber. Through a variation in the transverse surface of the compensation chamber, it is possible to obtain optionally an under- or over-compensation or a complete compensation.

A drawback of such an apparatus is the occurrence of power loss because a continuous fluid flow is present from the cylinder space through the filler hole to the compensation chamber and to the outside in order to maintain in the compensation chamber a complete fluid filling in spite of the varying contents, of which adjacent the rotation shaft the pressure is equal to the surrounding pressure. The volume of said fluid flow depends on the pressure in the cylinder space effected by the fluid supply to the cylinder space (resulting in a throttling force between the pulley side plates) and the size of the filler hole. In case of rapid variations of the interspace between the disc side plates, the filler hole should be large, in particular when this has to be coupled with a small throttling force between the pulley side plates, so with a low active over-pressure in the cylinder space. The volume of the fluid flow across the compensation chamber is maximal when a maximal throttling force has to be exercised; at the same time the power loss per quantity of fluid flow from the cylinder space is maximal by the high over-pressure in the cylinder space. This requires a substantial additional capacity of the fluid supply pump in order to maintain the appropriate pressure in the cylinder space in spite of the outflow through the filler hole.

It is the object of the invention to provide a stepless variable V-belt transmission wherein the required capacity of the fluid pump for the control and the energization of the variable V-belt transmission can be considerably lower.

To this effect according to the invention there are means for fully or partly closing the filler hole.

According to a further feature of the invention the means are adapted for shutting off the filler hole in function of the speed of the pulley. In case of a low speed the pressure increase as a result of centrifugal forces of the fluid in the cylinder space is slight (said pressure increase is proportional to the square of the speed of rotation), so that compensation thereof can be abandoned without inconvenience. Low rotational speeds occur in general with a large travelling diameter of the V-belt. If it moreover concerns a secondary pulley of a transmission having a substantially constant in-put torque, the peripheral force in case of a large travelling diameter of the V-belt between the V-belt and the pulley side plates is largest so that the throttling force has to be large and therefore requiring fluid to be supplied at a high pressure to the cylinder. Without closure of the filler hole the power loss as a result of the fluid flow through the compensation chamber is maximal under these conditions.

However if a complete compensation is required, already a slight bore area of the filler hole under these conditions will be sufficient for an effective compensation. The pressure in the cylinder space as a matter of fact is large in order to effect the large throttling force so that in spite of the slight passage sufficient fluid will flow through the filler hole.

According to another feature of the invention the means may close the filler hole in function of the interspace of the pulley side plates. The low speeds of rotation will in general be realized in case of a large travelling diameter of the V-belt, which corresponds to a slight interspace between the pulley side plates.

A constructively simple closure can be achieved if between the cylinder space and the compensation chamber there is mounted an axial bore wherein according to another feature of the invention there is disposed an axially movable control member which is provided with a recess for forming the filler hole. The construction may be such that one of the side plates is integral with the cylinder of the cylinder-piston unit, the piston separating the cylinder space from the pressure compensation chamber and being provided with an axial bore and the control member being fixed relative to the cylinder according to a feature of the invention. When the interspace between the pulley side plates is large, when the piston has moved in axial direction relative to the cylinder, there will be created a filler hole via the recess in the control member, while in case the interspace between the pulley side plates becomes smaller the cylinder and hence the control member, will move axially relative to the piston so that the filler hole will be either gradually reduced or be suddenly shut off when passing a specific position.

In this manner it is possible e.g. to effect a volume flow towards the compensation chamber if the throttling force directly depends on the travelling diameter. A specific throttling force corresponds then to a specific operating pressure in the cylinder space and likewise with a specific position of the control member relative to the piston.

Naturally it is possible to combine the degree of closure of the filler hole dependent on the speed of rotation and of the interspace of the pulley side plates, or to combine these or each of said controls with a degree of closure dependent on the pressure differential between the cylinder space and the compensation chamber, e.g. by a spring-loaded valve. The latter control is, as will be clear, also dependent on the operating pressure in the compensation chamber. At a higher compensation pressure the spring-loaded valve will be closed and the power loss will be minimized.

Some embodiments of a pulley arrangement according to the invention will now explained by way of example, with reference to the accompanying drawings, wherein FIGS. 1, 2, 3 and 4 diagrammatically show, partly in cross-section, a pulley, one of the side plates of which is integral with a hydraulic cylinder-piston unit. Corresponding parts are indicated in the various Figures by the same reference numerals.

The Figures all show a pulley side plate 1 which is fixedly connected to a shaft 2. The side plate 1 has a conical inner surface 3. A second side plate 4 is fixed against rotation and mounted on shaft 2 for axial movement. Said attachment may e.g. be effected by means of a keyway. The pulley side plate 4 has likewise a conical inner surface 5. A V-belt 6 may run over the V-shaped pulley formed by the two side plates 1 and 4. The travelling diameter of the pulley 6 depends on the interspace of the side plates 3, 4. In case of a smaller interspace, the travelling diameter becomes larger (as indicated in the Figures by a dashed line).

The side plate 4 is integral with cylinder wall 7 which extends coaxially about the shaft 2 and enclosing a cylinder space 8. The cylinder space 8 is shut off by a piston 9 and is annular. The piston 9 is affixed on shaft 2.

Shaft 2 is provided with a coaxial bore 10 which, via radial bore 11 communicates with the cylinder space 8. Via bore 10, 11 fluid may be conducted under pressure to the cylinder space 8 so that the space 8 will be pressurized and the side plate 4 is pushed towards side plate 1, so that there is produced a throttling force on belt 6, which effects both the travelling diameter of the V-belt 6 and the tension in the belt.

Since the cylinder-piston unit, as well as the pulley, is subjected to a rotation, there will be an additional pressure build-up in the fluid in the cylinder space 8 which is proportional to the square of the speed of rotation. This additional pressure results in an additional throttling force which may be highly undesirable. The high speeds of rotation as a matter of fact, which in general occur at a small travelling diameter of the V-belt, in which case the throttling force may be relatively small.

For compensating the additional pressure in the cylinder space 8 as a result of centrifugal forces there is mounted an annular compensation chamber 12 which is enclosed by piston 9, cylinder wall 7 and a sealing washer 13 directed inwardly of the cylinder wall 7, which is attached e.g. by means of bolts to the cylinder wall 7. The compensation chamber 12 is connected to the surrounding space via an annular gap 14 between the inner circumference of sealing washer 13 and an axially directed portion 15 of piston 9. The size of the gap 14 is such that the pressure in the compensation chamber 12 adjacent the gap 14 is substantially equal to the ambient pressure, so that the pressure in the compensation chamber 12, upon rotation of the cylinder-piston unit, is substantially only the result of the centrifugal forces. This pressure in the compensation chamber results in a reduction of the throttling force and thus compensates at least partly the additional pressure in the cylinder space.

The fluid supply to the compensation chamber 12 is effected from the cylinder space 8. In the four embodiments shown in the Figures different manners of fluid supply to the compensation chamber are employed.

As shown in FIG. 1 the piston 9 is provided with an axial bore wherein there is movably mounted a control member 16 which is provided with a channel 17 being in communication with the cylinder space 8. In the position shown in FIG. 1 the channel 17 opens into the compensation chamber 12 so that fluid from the cylinder space 8 will flow to the compensation chamber. The control member 16 abuts both against pulley side plate 4 and sealing washer 13. When reducing the interspace of the pulley side plates 1, 4, the control member will slide through the bore so that at a given moment the exit of channel 17 in the compensation chamber will be shut off. If the degree of filling of the compensation chamber is subsequently reduced in that fluid flows from gap 14, the compensation effect will be reduced but no loss of fluid from the cylinder space will occur thereby.

The control member 16 may also be designed with one or more axial grooves at the outside surface. By imparting a variable depth to said grooves it is possible to make the through-flow area for the fluid flowing from the cylinder space to the compensation chamber dependent on the interspace of the pulley side plates 1, 4.

Figure 2:
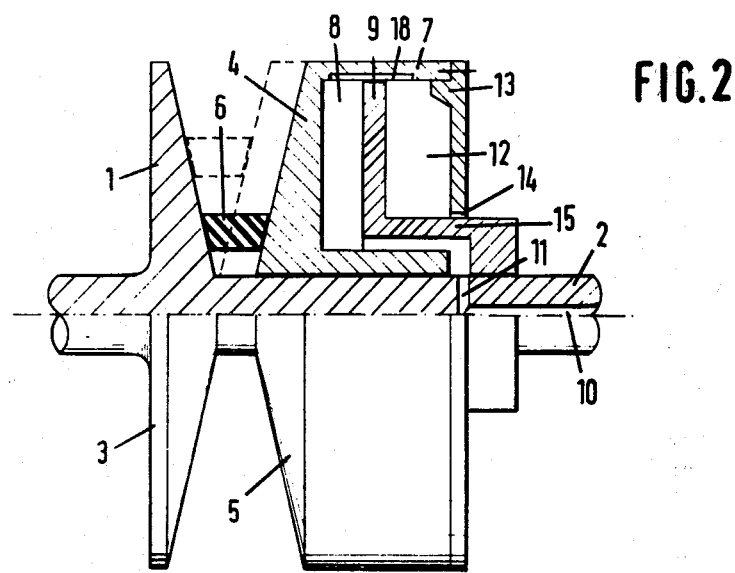

As shown in FIG. 2 a recess 18 is provided in the cylinder wall 7 which recess may consist of an axial groove, a number of axial grooves or a recess disposed therearound. As in the embodiment shown in FIG. 1, the fluid supply in the embodiment shown in FIG. 2 from the cylinder space 8 to the compensation chamber depends on the interspace of the pulley side plates 1, 4.

Figure 3:
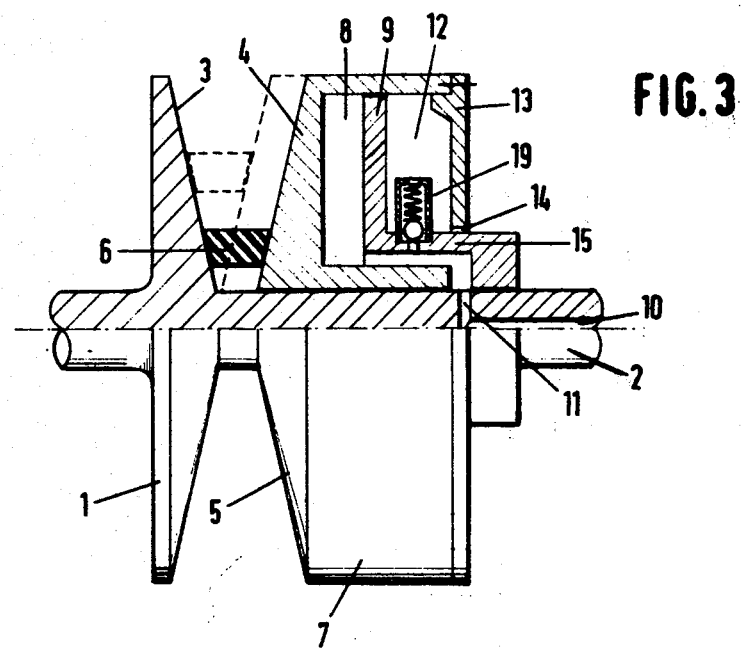

In the embodiment shown in FIG. 3, the fluid supply to the compensation chamber is substantially dependent on the speed of rotation. In the axial portion 15 of piston 9 there is disposed a spring-loaded valve 19. In case of a sufficiently high speed of rotation, the valve will be opened by the centrifugal force so that the fluid supply may be effected. By designing the valve comparatively heavy and the spring relatively rigid, the influence of the pressure differential between the cylinder space and the compensation chamber may be reduced.

Figure 4:
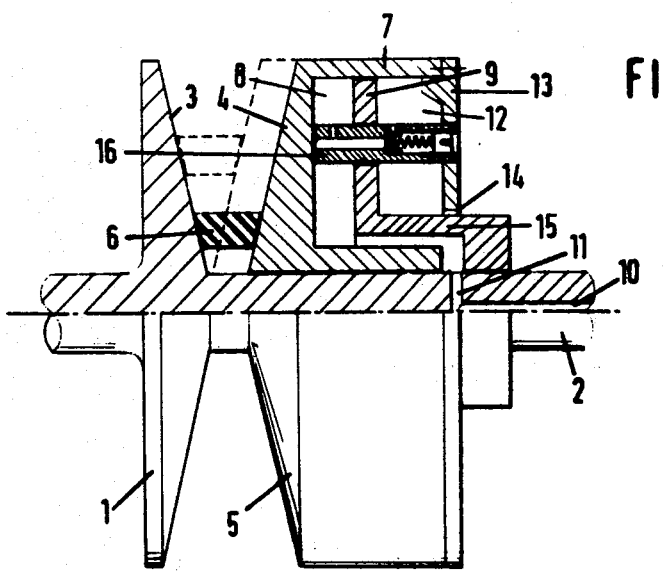

In the embodiemnt shown in FIG. 4 the fluid supply depends both on the interspace of the pulley side plates (compare FIG. 1) and on the pressure differential between the cylinder space 8 and the compensation chamber 12, as a result of which there will be no loss in power if the pressure differential between the cylinder space and the compensation chamber has come below a specific value. The control member 16 in FIG. 4 is fixedly mounted, e.g. screwed, in the sealing washer 13.

We claim:

1. A stepless variable transmission having an endless transmission means and at least a V-shaped pulley of which at least one side plate is fixedly connected to a hydraulic cylinder-piston unit for axially moving said side plate, the cylinder-piston unit being provided with a pressure compensation chamber for compensating pressure increases in the cylinder space as a result of centrifugal forces, an axial bore extending between the cylinder space and the compensation chamber, and means for supplying pressure fluid from the cylinder space through a filler hole to the compensation chamber and for shutting off the filler hole dependent on the distance between the pulley side plates, said means including a control member axially movable through said bore, said control member having a channel in communication with the cylinder space and with said filler hole so that at a preselected axial position of said control member said filler hole will be blocked by the wall of said axial bore.

2. An apparatus according to claim 1, wherein one of the pulley side plates is integral with the cylinder of the cylinder-piston unit, the piston separating the cylinder space from the pressure compensation chamber, and the piston being provided with an axial bore, characterized in that the control member is fixed relative to the cylinder.

* * * * *